United States Patent
Grams et al.

(10) Patent No.: US 6,560,949 B2
(45) Date of Patent: May 13, 2003

(54) ROBOTIC END EFFECTOR WITH COUNTER-ROTATING FINGERS

(75) Inventors: Robert S. Grams, Waukesha, WI (US); Thomas C. Bauman, North Prairie, WI (US)

(73) Assignee: ABB Automation, Inc., New Berlin, WI (US)

(*) Notice: Subject to any disclaimer, the term of this patent is extended or adjusted under 35 U.S.C. 154(b) by 0 days.

(21) Appl. No.: 10/177,700

(22) Filed: Jun. 21, 2002

(65) Prior Publication Data

US 2003/0005666 A1 Jan. 9, 2003

Related U.S. Application Data

(62) Division of application No. 09/521,226, filed on Mar. 8, 2000, now Pat. No. 6,474,047.
(60) Provisional application No. 60/124,427, filed on Mar. 15, 1999.

(51) Int. Cl.⁷ .................................................. B65B 5/08
(52) U.S. Cl. .............................. 53/473; 53/244; 53/247
(58) Field of Search .......................... 53/244, 473, 247, 53/540; 414/665, 669, 737, 789.5; 294/81.52, 88; 901/30, 36

(56) References Cited

U.S. PATENT DOCUMENTS

| | | |
|---|---|---|
| 1,767,525 A | 6/1930 | Hoffman |
| 3,424,488 A | 1/1969 | Renfroe |
| 3,558,178 A | 1/1971 | Taylor |
| 3,559,371 A | 2/1971 | Borrowman |
| 3,655,232 A | 4/1972 | Martelee |
| 4,723,353 A | 2/1988 | Monforte |
| 4,975,018 A | 12/1990 | Langenbacher et al. |
| 6,082,080 A | 7/2000 | Holter et al. |

FOREIGN PATENT DOCUMENTS

| | | |
|---|---|---|
| DE | 24 10 769 | 9/1975 |
| DE | 37 15 140 | 11/1988 |
| DE | 42 17 333 | 12/1993 |
| FR | 1.287.442 | 7/1962 |
| JP | 06-344287 | 12/1994 |

OTHER PUBLICATIONS

U.S. patent application Ser. No. 09/521,226, Grams et al.
C & D Robotics, Palletizing system: a bright idea, Modern Materials Handling, Sep. 1991, 2 pages, Cahners Publishing Company.

(List continued on next page.)

*Primary Examiner*—Scott A. Smith
*Assistant Examiner*—Chukwurah Nathaniel
(74) *Attorney, Agent, or Firm*—Micheal Best & Friedrich LLP

(57) ABSTRACT

A method of handling an object using a robot end effector. The method includes providing a robot having an end effector supporting a pair of carriages, providing a pair of fingers for each carriage, moving the end effector over an object, grasping an object with the fingers, moving the object with the end effector to a container, and depositing the object by counter-rotating the pairs of fingers. One or both of the carriages is movable toward the other carriage to engage objects on a conveyor system with the fingers. The robot moves the end effector between the conveyor system and shipping containers for shipping the objects. Because the pairs of fingers counter-rotate, the friction forces between each finger and the tray is offset by the friction forces between the other finger in the pair and the tray. The improved handling method thereby maintains objects substantially in the desired stacking orientation within the shipping container. Preferably, an actuator is provided for each finger. A change-out mechanism may also be provided to facilitate replacing the fingers.

4 Claims, 9 Drawing Sheets

OTHER PUBLICATIONS

C & D Robotics, Robots Lend Muscle To Palletizing, Managing automation 2, Jun. 1992, 2 pages, Thomas Publication.

C & D Robotics, Robotic Palletizers Tie 10 Lines Together, Jan. 1993, 4 pages, Cahners Publishing Company.

Alvey, Gantry Palletizer can span several conveyors, pallets, or workcells, Industrial Equipment News, Mar. 1993, 1 page, Thomas Publishing Company.

Advanced Technology and Research Corporation (ATR), Real Time Control Engineering Automation, 1997, 8 pages.

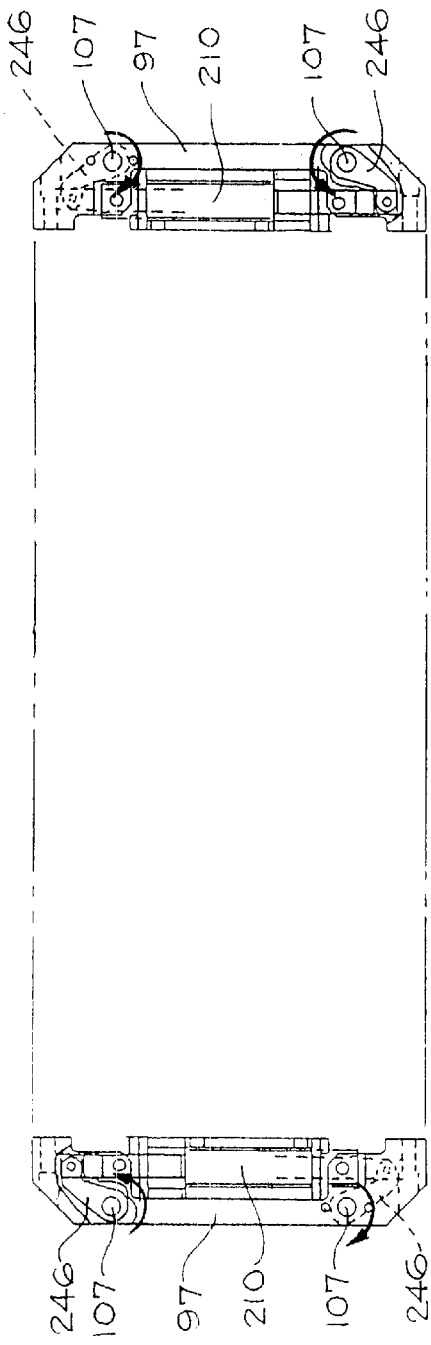
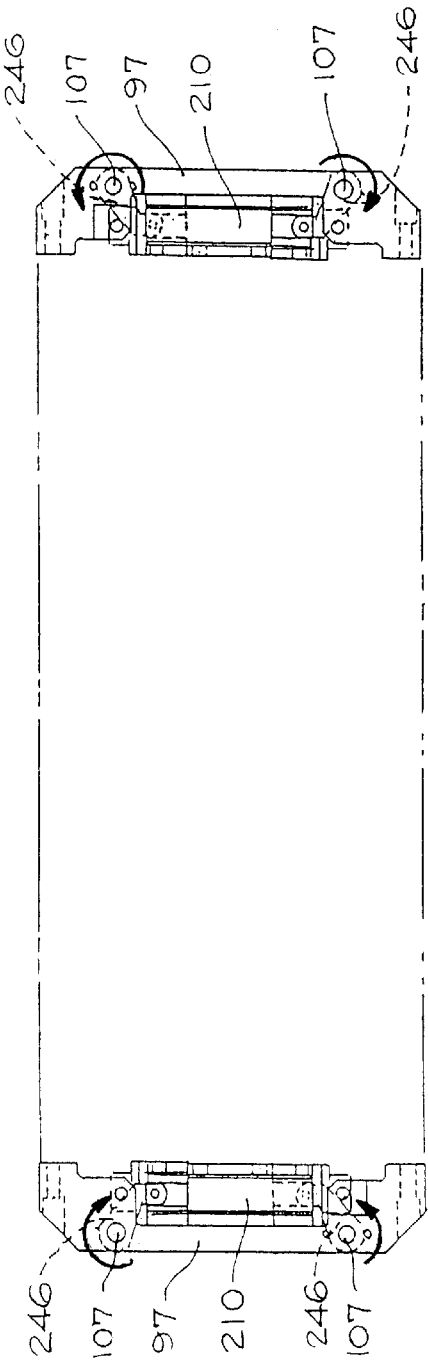
Fig 7A
Fig 7B

US 6,560,949 B2

ROBOTIC END EFFECTOR WITH COUNTER-ROTATING FINGERS

RELATED APPLICATIONS

This application is a divisional of U.S. patent application Ser. No. 09/521,226, filed Mar. 8, 2000, now U.S. Pat. No. 6,474,047, which claims the benefit of U.S. Provisional Application No. 60/124,427, filed on Mar. 15, 1999.

FIELD OF THE INVENTION

The present invention relates to systems and devices used to load containers. More particularly, the present invention relates to a robotic end effector used to load mail trays of different shapes and sizes into containers.

BACKGROUND OF THE INVENTION

Millions of pieces of mail are deposited with the postal service every day. The deposited mail is sorted, generally by ZIP or other code, and shipped to the proper destination. Generally, the sorting process involves placing mail with the same or related codes into trays. The trays are then placed in containers for shipment. Some parts of this process have been automated, including the sorting of mail by ZIP code. However, the trays are often placed in the containers manually. With ever-increasing mail demands, faster, more efficient methods of and devices for loading containers with mail trays are needed.

SUMMARY OF THE INVENTION

The present invention provides an improved end effector for handling mail trays and tubs. The end effector includes first and second carriages, each having a pair of fingers depending therefrom. At least one of the carriages is movable toward the other carriage to grasp a tray between the respective pairs of fingers. The pairs of fingers counter-rotate to cause the support portions to engage and disengage the tray.

Each carriage has a body and first and second fingers. Each finger has a support portion and a journal portion having a longitudinal axis. The journal portion of each finger is supported by the body for rotation about the longitudinal axis. The support portion is angled with respect to the longitudinal axis. At least one actuator selectively causes the journal portions to counter-rotate with respect to each other. Because the fingers counter-rotate with respect to each other, the friction forces between each finger and the tray offset the friction forces between the other finger and the tray, such that the tray remains substantially in the desired stacking orientation.

In a preferred construction, the carriage includes first and second actuators, and the first and second actuators cause the first and second fingers, respectively, to selectively rotate. A pair of spaced-apart journal bearings supports the journal portion of each finger for rotation with respect to the body. A split clamp and actuator arm may be disposed between each pair of journal bearings to interconnect each finger with an associated actuator. The clamp includes a change-out mechanism to facilitate replacement of the fingers. Spacers may be provided to facilitate rotation of the fingers, clamps, and actuator arms with respect to the body.

Preferably, the end effector also includes a harness assembly for supply lines between the end effector and the rest of the robot. The harness reduces the likelihood of tangling and pinching the supply lines as the end effector moves with respect to the rest of the robot. The end effector also preferably includes a shelf lowering mechanism to manipulate shelves in the containers.

The present invention also provides a method for handling a tray. The method includes using an end effector having fingers to pick up and move the tray to a container, and counter-rotating the fingers to release the tray in the container.

Other features and advantages of the invention will become apparent to those skilled in the art upon review of the following detailed description, claims, and drawings.

BRIEF DESCRIPTION OF THE DRAWINGS

FIG. 7A is a cross-sectional view taken along line 7—7 in FIG. 4 illustrating the actuators in an extended condition.

FIG. 7B is a cross-sectional view taken along line 7—7 in FIG. 4 illustrating the actuators in a retracted condition.

Figure 1:
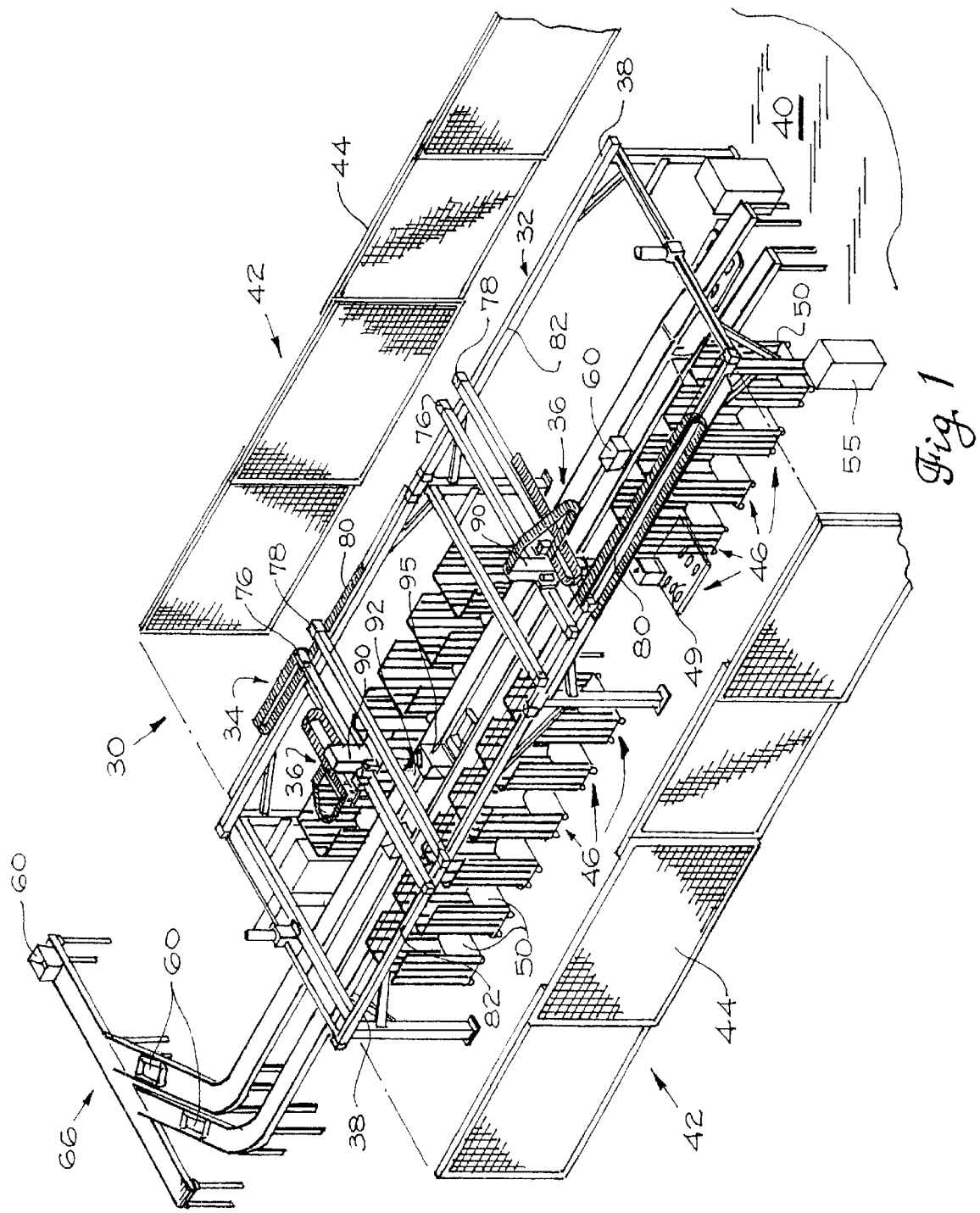
FIG. 1 is a partially exploded, perspective view of a system embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a containerization and palletizing system 30. The illustrated system 30 includes two cells 32, 34, each equipped with a gantry or overhead-type robot 36. As one of ordinary skill in the art will appreciate, the invention may alternatively be embodied in a system having one cell and one robot, more than two cells and robots, or having other types of robots.

Each cell 32, 34 has a frame 38 which may be secured to a hard surface such as a concrete floor 40. The space between the frame members may be enclosed with a perimeter fence 42, a mesh, a similar material, or even other types of walls. One or more gates or doors 44 may be provided to permit access to the interior of the cell. Each cell 32, 34 has a plurality of places or bays 46 for pallets 49, carts 50, and any other suitable transport device (generically referred to herein as "containers"). Sensors (not shown) sense the presence or absence of containers in the bays 46 and that information is communicated to a system controller 55.

Mail trays, tubs, flats, and similar cartons (generically referred to herein as "trays") 60 are brought into the cells 32, 34 by a conveyor system 66. The illustrated conveyor system 66 includes two generally parallel conveyors. Sensors (not shown) positioned along the conveyors detect the location and presence of trays 60 on the conveyors. Information from the sensors is communicated to the system controller 55.

The robot 36 in each cell 32, 34 is mounted on beams 76, 78 spanning the cell. The beams 76, 78 are mounted on powered and guiding tracks 80, 82, respectively. The robot 36 is movable along the beams 76, 78 and the beams 76, 78 are movable on the tracks 80, 82. The tracks 80, 82 are positioned generally parallel to the floor 40. Each robot 36 includes a vertically telescoping arm 90, a turning disc or wrist 92, and an end effector or gripper 95 (FIGS. 2–6).

FIGS. 2–5 illustrate the end effector 95, which is substantially identical for both robots 36. The end effector 95 includes a pair of carriages 97 supported by a chassis 105. Each carriage 97 has a pair of fingers 107 associated therewith. The fingers 107 include a journal portion 110 having a longitudinal axis 112 (FIG. 6A), and a bent or support portion 114 angled with respect to the longitudinal axis 112. Preferably, the bent portion 114 is angled about 80° with respect to the longitudinal axis 112. The fingers 107 are shaped to accommodate a wide variety of trays 60. As will be described in more detail below, the fingers 107 are rotatable to an engaged position shown in solid lines in FIGS. 2–5, and to a disengaged position shown in phantom in FIGS. 2 and 5. The bent portions 114 are disposed beneath a tray 60 when the fingers 107 are in the engaged position, and are rotated clear of the tray 60 when the fingers 107 are in the disengaged position.

Figure 2:
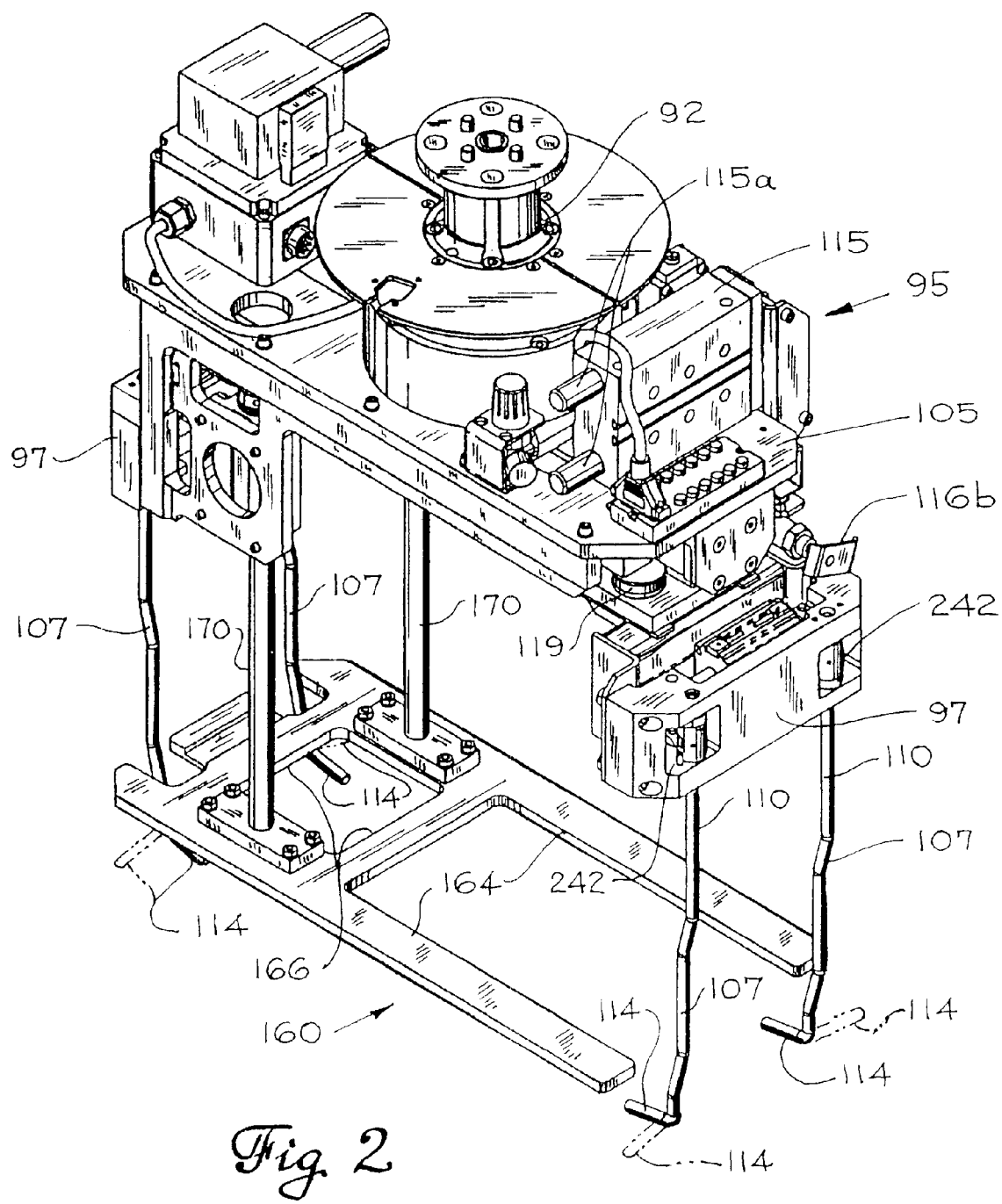
FIG. 2 is an enlarged perspective view of an end effector from the system in FIG. 1 taken from above the end effector.
Figure 5:
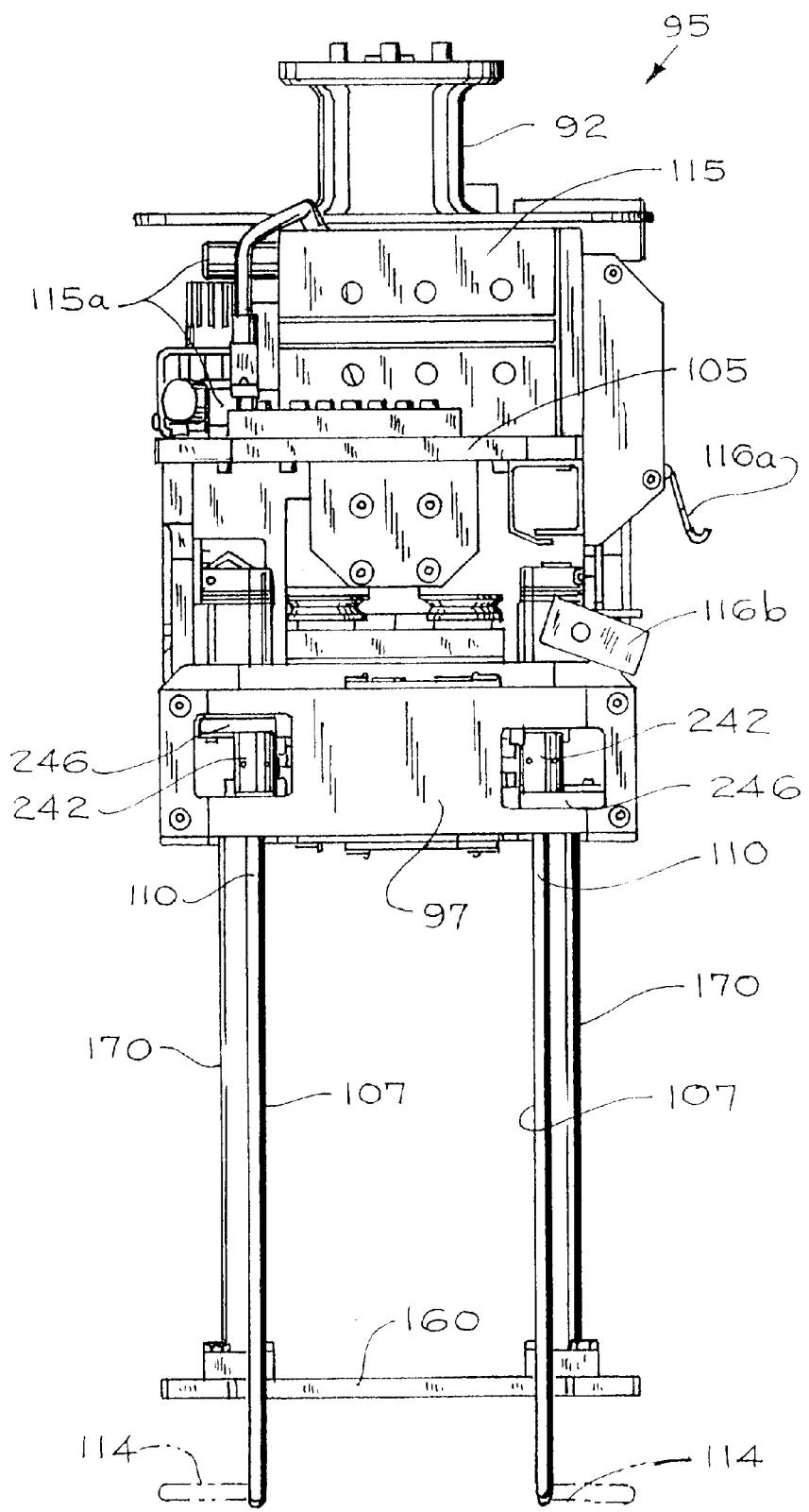
FIG. 5 is an end view of the end effector of FIG. 2.

With reference to FIGS. 2 and 5, in order to load containers having shelves, the end effector 95 may also include a shelf-lowering assembly including an actuator 115 slidable on a pair of rods 115a, a finger 116a, and a shelf latch release mechanism 116b. The actuator 115 is oriented with one rod 115a above the other to create a high, narrow profile. This orientation provides a more compact end effector 95, as the actuator 115 does not consume a large amount of horizontal space. The actuator 115 selectively causes the finger 116a and latch release mechanism 116b to extend into the container. The latch release mechanism 116b engages a latch that holds the shelf in an upright condition, and releases the latch so that the finger 116a catches the shelf. The end effector is then lowered by the robot to lower the shelf to a horizontal position. The robot then continues to load trays into the container.

Figure 3:
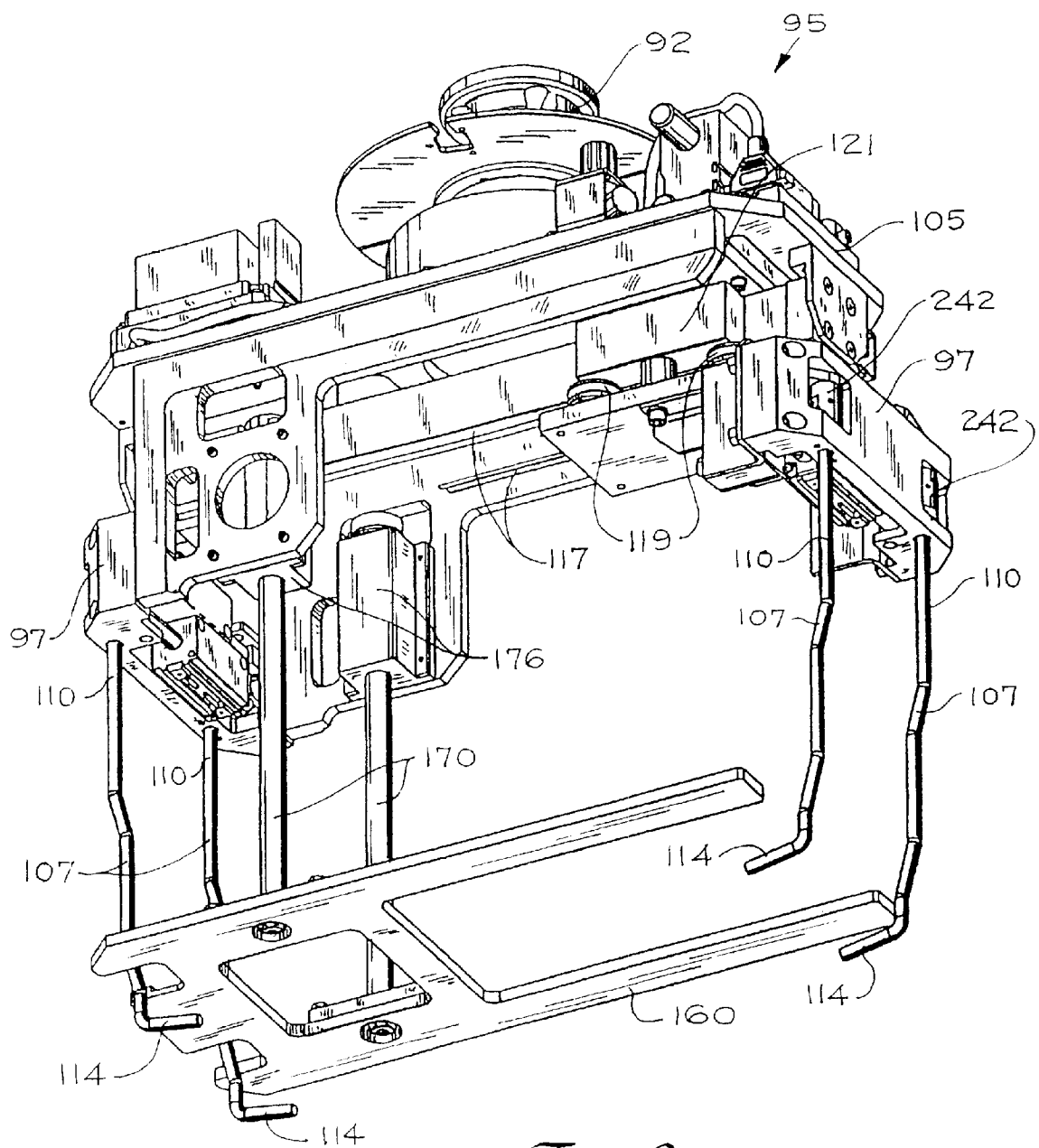
FIG. 3 is a perspective view of the end effector of FIG. 2 taken from below the end effector.
Figure 4:
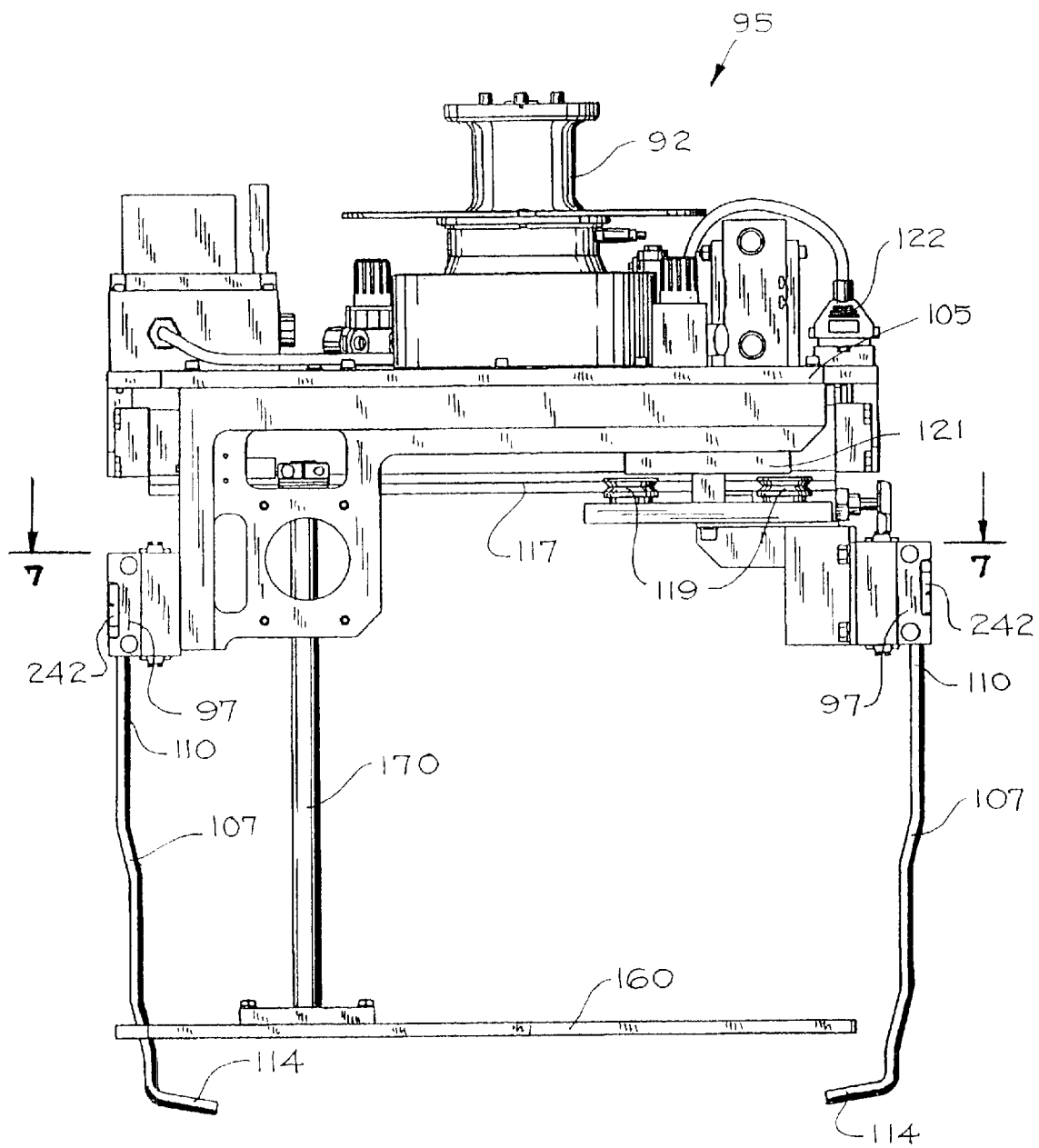
FIG. 4 is a side elevational view of the end effector of FIG. 2.

Referring to FIGS. 3 and 4, one of the carriages 97 is a movable carriage coupled to a track 117 by a plurality of slides or wheels 119 and moved by a carriage actuator 121 (such as a rodless cylinder, but preferably a multiple-pressure clamp cylinder) coupled to the chassis 105. The clamp force of the carriage actuator 121 may be controlled using a valve, such as an open/closed air control valve, and a proximity switch, such as an intermediate-open proximity switch.

The end effector 95 also includes a mail measurement and containment plate 160, which is used by the controller 55 to detect and measure the height of trays 60 in containers. The measurement and containment plate 160 includes two long arms 164 (FIG. 2) and a pair of cross members 166, although the plate 160 can have other shapes and provide similar functionality. The measurement and containment plate 160 is gravity driven, supported by a pair of linear rods 170 which are mounted in bearings 176 (FIG. 3).

Figure 6A:
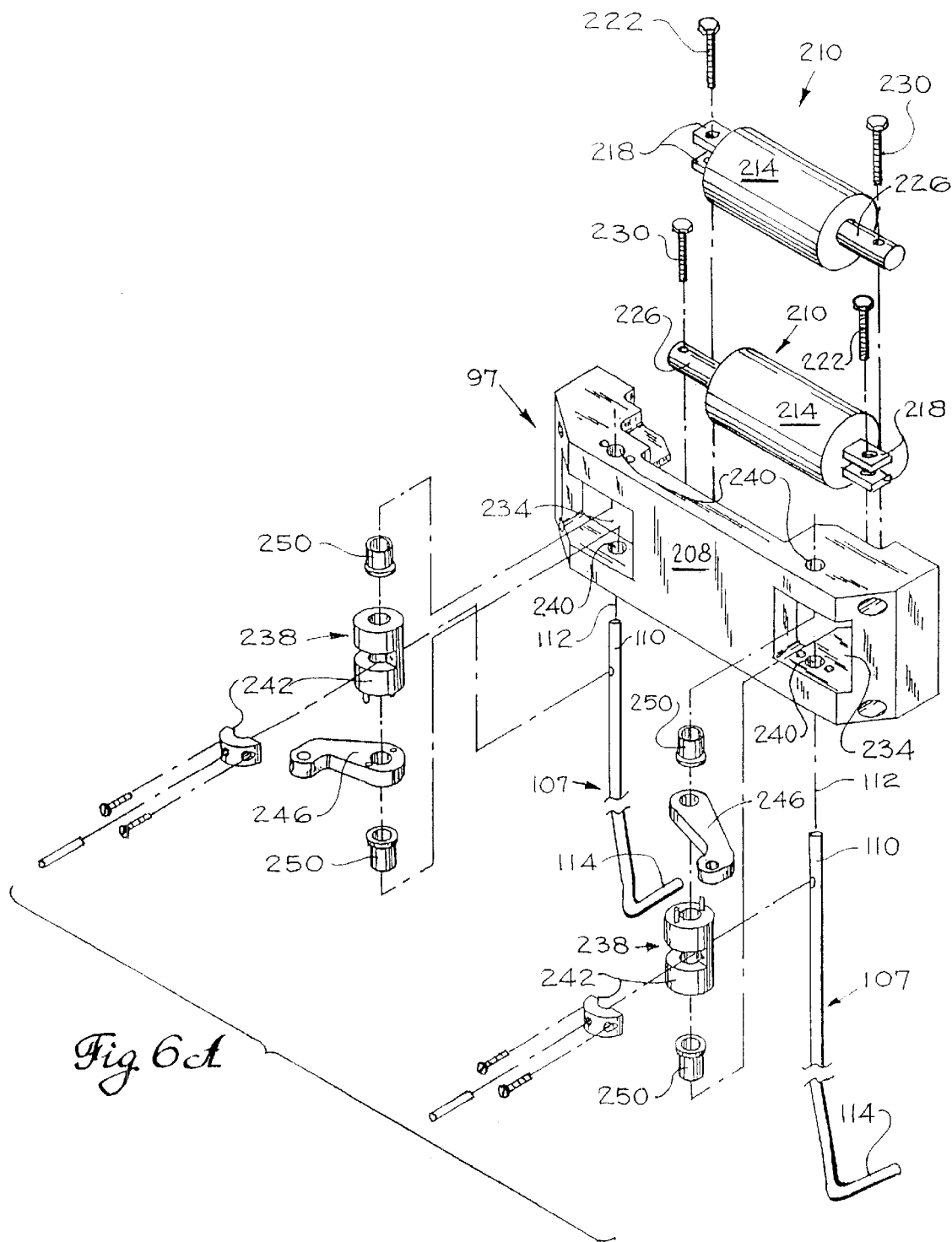
FIG. 6A is an enlarged exploded view of a carriage of the end effector of FIG. 2.

FIG. 6A illustrates one of the carriages 97; it being understood that both carriages 97 of each end effector 95 are substantially identical unless specifically described otherwise. The carriage 97 includes a body 208 and two actuators 210 which may be pneumatic, hydraulic, electric, or any other appropriate actuators. Each actuator 210 includes a cylinder 214 with a first end 218 that is fixed to the carriage body 208 with a suitable fastener or pin 222. Each actuator 210 also includes a piston 226 slidable with respect to the cylinder 214. A pin or other suitable fastener 230 extends through the distal end of each piston 226. Alternatively, a clevis may be attached to or integrally formed with the piston 226 and the pin 230 may extend through the clevis.

Each end of the carriage body 208 includes a cavity or space 234 in which a coupling assembly 238 is positioned. A pair of spaced-apart holes in each end of the carriage body 208 serves as journal bearings 240 for the fingers 107. The journal portion 110 of one of the fingers 107 extends through the coupling assembly 238 and the journal bearings 240. The finger 107 is held in the journal bearings 240 above and below the coupling assembly 238. Because both ends of the carriage 97 are substantially identical to the other end, only one end is described below.

Figure 6B:
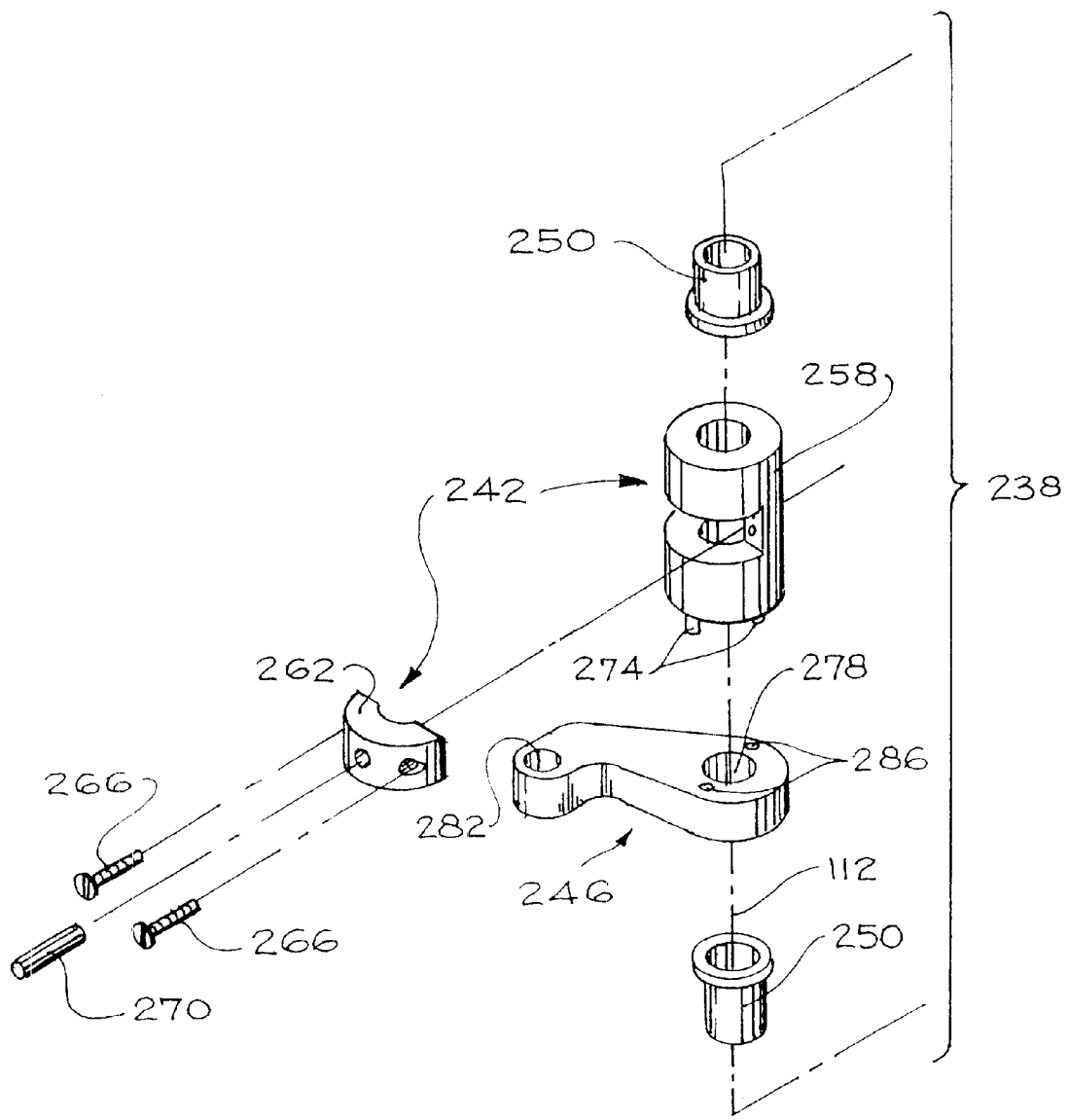
FIG. 6B is an enlarged exploded view of the coupling assembly shown in FIG. 6A.

With reference to FIGS. 6A and 6B, the coupling assembly 238 includes a clamp 242, an actuator arm 246, and a pair of spacers 250. As best seen in FIG. 6B, the clamp 242 is a split clamp including first and second portions 258, 262, respectively. The first portion 258 includes a pair of holes through which the journal portion 110 of the finger 107 extends. The second portion 262 includes a pair of clearance apertures for fasteners 266, and an aperture for a coupling pin 270. The fasteners 266 extend through the clearance holes and thread into the first portion 258 to hold the first and second portions 258, 262 together. The coupling pin 270 extends through the aperture in the second portion 262 and into a hole in the journal portion 110 to couple the clamp 242 and finger 107 together. The clamp 242 also includes cleats 274 for coupling the clamp 242 and actuator arm 246 as described below.

The clamp 242 is preferably configured such that the finger 107 is tightly sandwiched between the first and second portions 258, 262 so that the coupling pin 270 is not exposed to all the shear stress caused by the weight of trays 60 being transported by the finger 107 and caused by rotation of the finger 107. The finger 107 may be removed and replaced by removing the fasteners 266 and coupling pin 270, letting the finger 107 drop through the assembly 238 under the influence of gravity, inserting a replacement finger 107 through the assembly 238, and reattaching the second portion 262 of the clamp 242, the fasteners 266, and the coupling pin 270.

The coupling pin 270 may be used to support the finger 107 and free up one hand of the installer when the replacement finger 107 is installed, making it easier to insert the fasteners 266. As an alternative to the coupling assembly illustrated, and to further facilitate replacing fingers, the coupling pin 270 may be integrally formed with either the first or second portions 258, 262 of the clamp 242, and the fasteners 266 may be replaced with an over-center clasp or another quick-release fastener. The illustrated clamp 242 and coupling pin 270, and variations thereof and alternatives thereto, provide a change-out or quick-release mechanism that facilitates a relatively easy and quick changing of damaged or worn fingers 107.

Still referring to FIG. 6B, the actuator arm 246 includes a finger hole 278 at one end, an actuator pin hole 282 at the opposite end, and a plurality of cleat holes 286. The journal portion 110 of the finger 107 extends through the finger hole 278. The cleat holes 286 receive the cleats 274 of the clamp 242 to couple the actuator arm 246 and clamp 242. The actuator pin hole 282 receives the pin 230 extending through the piston 226 of the actuator 210. If the end of the piston 226 includes a clevis, the actuator arm 246 may extend into the clevis and be pinned there. Thus, linear actuation of the piston 226 causes the actuator arm 246 to rotate about the longitudinal axis 112 of the journal portion 110 of the finger 107, which causes the clamp 242 to rotate due to the cleat 274 coupling, which in turn causes the finger 107 to rotate due to the coupling pin 270 and sandwiching clamp portions 258, 262.

FIG. 7A illustrates the actuators 210 in an extended condition, whereby the fingers 107 are in the disengaged position (shown in phantom in FIGS. 2 and 5). FIG. 7B illustrates the actuators 210 in a retracted condition, whereby the fingers 107 are in the engaged position. The fingers 107 associated with each carriage 97 are counter-rotated by the actuators 210. As used herein with respect to the relative rotation of the pair of fingers 107 associated with each carriage 97, "counter-rotate" means that one finger 107 rotates clockwise and the other finger 107 rotates counter-clockwise with respect to the fingers respective longitudinal axes 112, as shown in FIGS. 7A and 7B.

Referring again to FIGS. 6A and 6B, the spacers 250 extend at least partially into the journal bearings 240 and abut the clamp 242 or actuator arm 246. The spacers 250 thereby space the clamp 242 and actuator arm 246 from the carriage body 208 to reduce friction. The spacers 250 are preferably made of a low-friction, wear-resistant material, such as high molecular density plastic. The spacers 250 may also include roller bearings to further facilitate the rotation of the fingers 107.

Figure 8:
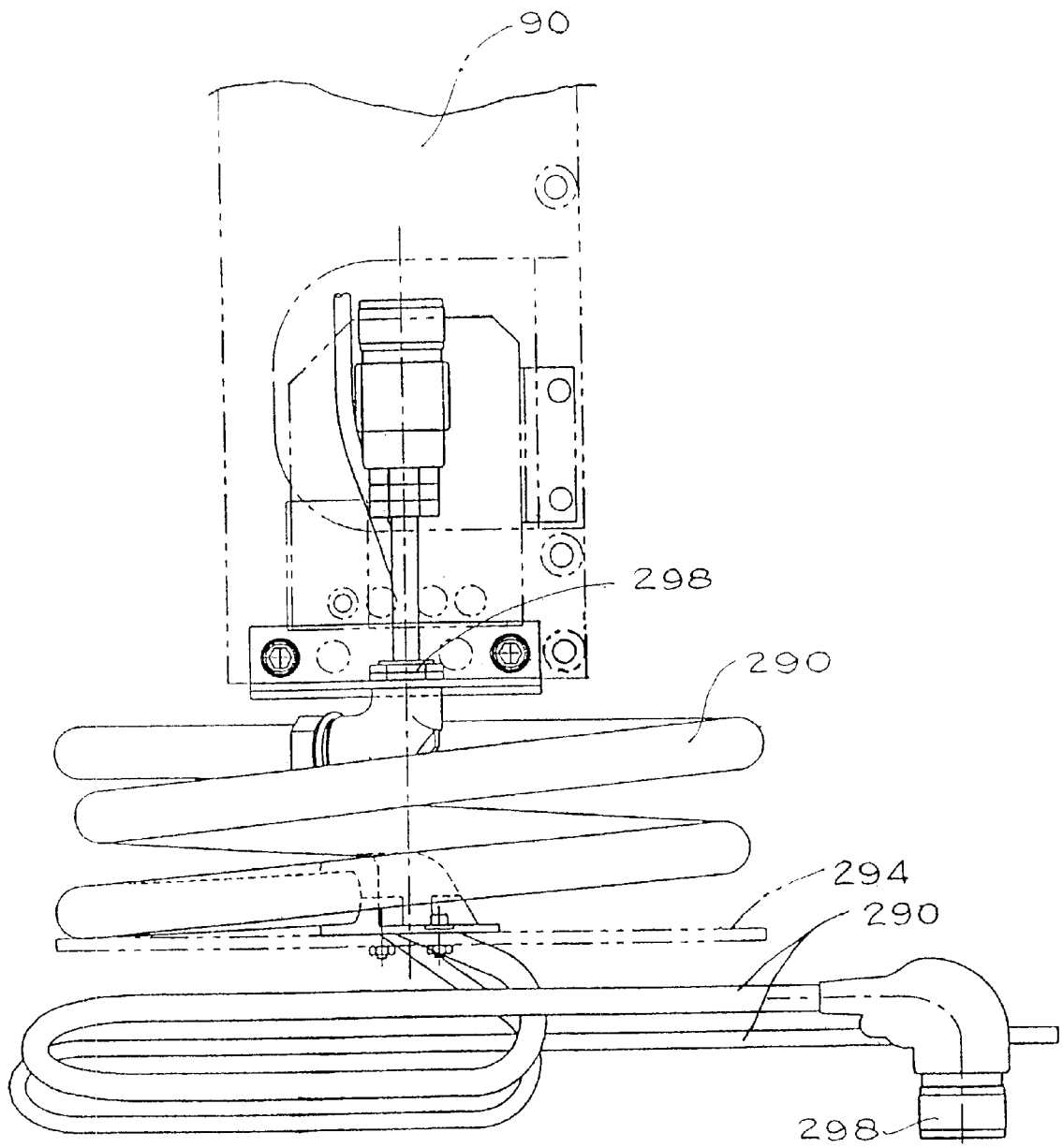
FIG. 8 is an enlarged side elevational view of a portion of the end effector illustrated in FIG. 2.

With reference to FIG. 8, fluid and electrical supply lines or hoses 290 extend through the telescopic arm 90 to the end effector 95. The fluid supply hose supplies the fluid used to actuate the various actuators 115, 121, 210 on the end effector 95, and may, for example, provide pressurized air or hydraulic fluid. The electrical supply line provides electricity for the various sensors and electrically-powered components of the end effector 95. Other lines may also extend through the telescoping arm 90, such as cables for relaying information from sensors to the controller 55. The lines 290 are coiled on a support plate 294 to prevent or reduce tangling of the lines and pinching of the fluid hose during operation of the robot 36. Plugs 298 are provided in the telescopic arm 90 and the end effector chassis 105 to easily disconnect and replace the lines 290. The plugs 298 facilitate servicing the robot 36.

The operation of the system 30 will now be described in light of the above disclosure. A tray 60, to be loaded into a container, is moved by the conveyor system 66 beneath one of the robots 36. The controller 55 moves the robot 36 over the tray 60 and the end effector 95 is lowered to position a pair of fingers 107 on either side of the tray 60 with the fingers 107 in the disengaged position. The fingers 107 are rotated to the engaged position by actuation of the actuators 210 to the retracted condition (FIG. 7B) and the movable carriage 97 is moved toward the fixed carriage 97 until the bent portions 114 of the fingers 107 are beneath the tray 60. Then the end effector 95 is raised, lifting the tray 60 with the fingers 107. The downward force exerted on the top of the tray 60 by the containment plate 160 helps maintain the grip of the fingers 107. The robot 36 is moved over the container and the end effector 95 lowered until the tray 60 rests on the container or on another tray 60 in the container. The height of the stacked trays 60 is measured with sensors monitoring the movement of the linear rods 170 and is used by the controller 55 to determine when the container is fully loaded. The actuators 210 are extended (FIG. 7A) to counter-rotate the fingers 107 to the disengaged position and the end effector 95 is raised or otherwise moved clear of the tray 60 and container.

The present invention can be embodied in alternative systems. For example, each carriage 97 may support more than two fingers 107. The fingers 107 may include substantially straight portions having bent portions disposed at 90° with respect to the straight portions. Both carriages 97 may be movable toward each other such that the carriages 97 center the tray 60 with respect to the end effector 95. A single actuator 210 may be used to counter-rotate two or more fingers 107 through a linkage. Other possible combinations and alternative constructions of the features described herein would be readily apparent to those of ordinary skill in the art and are not discussed.

What is claimed is:

1. A method of handling a tray, the method comprising:

providing a robot having an end effector supporting first and second carriages;

providing a pair of fingers for each carriage;

moving the end effector over the tray;

grasping the tray with the fingers;

moving the tray with the end effector to a container; and depositing the tray in the container with the end effector by counter-rotating the pairs of fingers.

2. The method of claim 1, wherein said depositing step includes counter-rotating the fingers with actuators.

3. The method of claim 1, wherein said depositing step includes counter-rotating each pair of fingers with a single actuator through a linkage.

4. A method of transporting an object using an end effector having a first and second carriage, a first and second pair of fingers, and at least one pair of actuators, said method comprising:

positioning said end effector over said object;

activating said pair of actuators to rotate said first and second pair of fingers to an engaged position;

moving said first carriage toward said second carriage until said first and second pair of fingers are beneath said object;

elevating said end effector to move said object to a desired location; and activating said actuators to rotate said first and second pair of fingers to a disengaged position.

* * * * *